United States Patent [19]

Bocci et al.

[11] Patent Number: 4,710,945

[45] Date of Patent: Dec. 1, 1987

[54] SIGNAL SELECTION BY STATISTICAL COMPARISON

[75] Inventors: Paul M. Bocci, Roselle; Carl M. Pietrzak, Jr., Schaumburg; Alan L. Wilson, Hoffman Estates, all of Ill.

[73] Assignee: Motorola, Inc., Schaumburg, Ill.

[21] Appl. No.: 858,462

[22] Filed: Apr. 30, 1986

[51] Int. Cl.$^4$ .............................................. H04B 7/08
[52] U.S. Cl. .................................. 375/100; 455/135; 380/42
[58] Field of Search ............................ 375/76, 94, 100; 455/135; 329/104; 364/554; 371/6; 380/42

[56] References Cited

U.S. PATENT DOCUMENTS

| | | | |
|---|---|---|---|
| 3,667,057 | 5/1972 | Pfersch et al. | 328/156 |
| 3,995,225 | 11/1976 | Horn | 329/106 |
| 4,174,502 | 11/1979 | Wilson et al. | 329/104 |
| 4,197,502 | 4/1980 | Sumner et al. | 375/75 |
| 4,214,213 | 7/1980 | Ferrie . | |
| 4,342,112 | 7/1982 | Stodola | 371/68 |
| 4,375,683 | 3/1983 | Wensley | 371/36 |
| 4,596,024 | 6/1986 | Thomson | 375/100 |

Primary Examiner—Robert L. Griffin
Assistant Examiner—James E. Busch
Attorney, Agent, or Firm—Thomas G. Berry

[57] ABSTRACT

A signal selection system is disclosed wherein a plurality of received signals are analyzed to determine their statistical characteristics. These characteristics are compared to a predetermined statistical distribution. The signal that is statistically closest to the statistical characteristics of a known signal is selected for further processing and reception.

16 Claims, 6 Drawing Figures

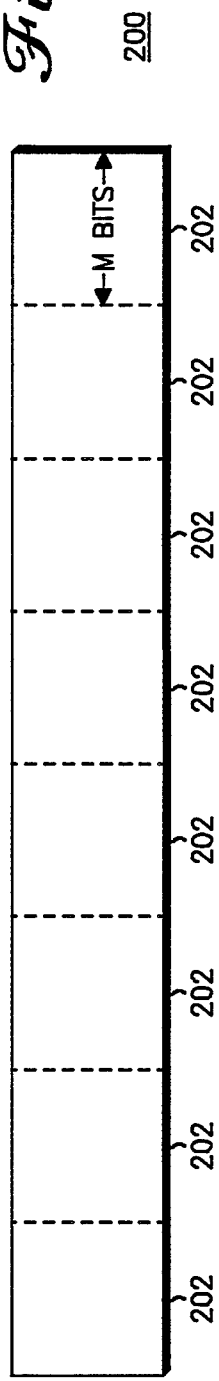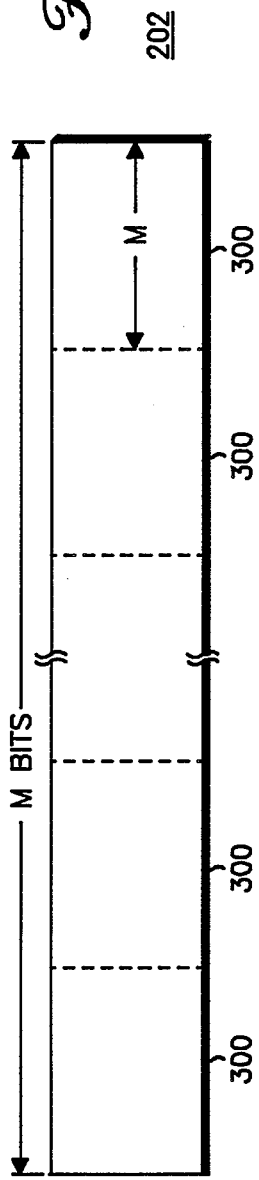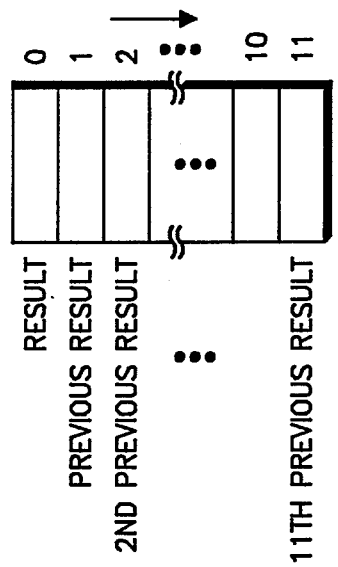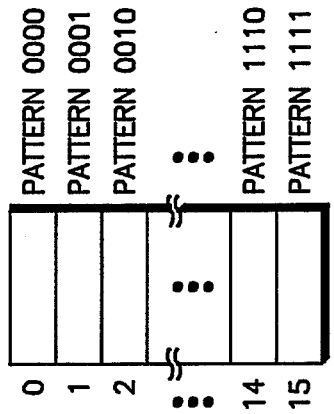
Fig. 2
Fig. 3a
Fig. 3b
Fig. 3c

SIGNAL SELECTION BY STATISTICAL COMPARISON

TECHNICAL FIELD

This invention relates generally to receiver selection and more particularly to a system for selecting the highest quality signal from a plurality of received digital signals.

BACKGROUND ART

To implement a total area coverage or a wide area coverage system, it is known in the art to provide a plurality of receiver sites to receive and relay the same information signal to a central receiving location. Generally, one or more of the plurality of received signals will have superior signal quality when compared to the other signals. In the mobile or portable communication environment, the signal having the highest signal quality may rapidly change as the mobile transceiver's proximity to a particular receiver site varies. Accordingly, it is necessary to continually determine which of the incoming plurality of received signals has superior signal quality, and select that signal to be received at the central receiving location.

In an analog modulation communication system, it is known to select a signal upon the basis of signal strength or received signal power. This simple criteria is generally sufficient in an analog system since the relative phases of the received signals are less critical to the selection criterion than in a digital modulation system. Accordingly, some digital selection systems have simply reconverted the digital signal into an analog signal, and compared the signals on the basis of received power as in the prior analog modulation communication systems.

Some digital selection systems have combined the plurality of received signals into a majority signal on the theory that if a majority of the received signals "thinks" the received bit should be a logical "1" the resultant majority signal bit-error-rate (BER) will necessarily be superior to any of the individual signals. Of course, the majority signal may not always have a superior BER since the mobile or portable transceiver could be in close proximity to a particular remote receiver site, thus providing one very high quality signal within the plurality of received signals. Moreover, majority selection systems suffer a severe detriment in that they, by definition, cannot operate with less than three incoming signals since there can be no majority with only two signals. Accordingly, the need exists to have a simple, inexpensive but reliable signal selection method that may operate on any number of incoming signals and overcomes the detriments of the prior art.

SUMMARY OF THE INVENTION

Accordingly, it is an object of the present invention to provide an improved digital signal selection system.

It is another object of the present invention to provide a signal selection system that may operate down to two received signals.

It is a further object of the present invention to provide a signal selection system that bases the signal selection upon a statistical analysis of the received signals.

Briefly, according to the invention, a plurality of received signals are analyzed to determine their statistical characteristics. These characteristics are compared to a predetermined statistical distribution. The signal that is statistically closest to the statistical characteristics of a known signal is selected for further processing and reception.

BRIEF DESCRIPTION OF THE DRAWINGS

The features of the present invention which are believed to be novel are set forth with particularity in the appended claims. The invention, together with further objects and advantages thereof, may be understood by reference to the following description, taken in conjunction with the accompanying drawings, and the several figures in which like referenced numerals identify like elements, and in which:

FIG. 2 is an illustration of the preferred method of segmenting a digital signal received in the system of FIG. 1;

FIGS. 3a–3c are illustrations of the preferred evaluation method;

DETAILED DESCRIPTION OF THE PREFERRED EMBODIMENT

Figure 1:
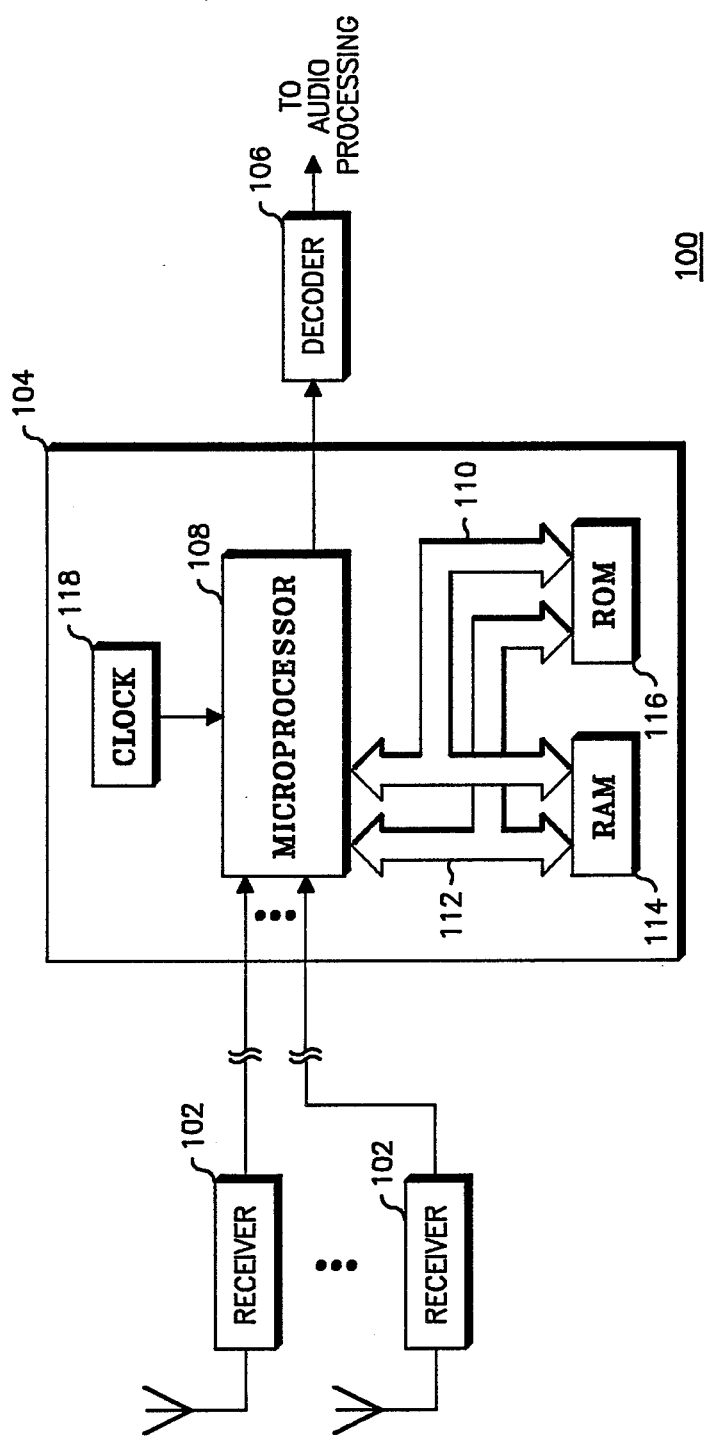
FIG. 1 is a block diagram of the signal selection system of the present invention.

Referring now to the drawings, and in particular to FIG. 1, there is shown the signal selection system 100 of the present invention. The system 100 is comprised of a plurality of unmatched receivers 102 (two shown) that provide a received digital signal to a selector 104. As used herein, an unmatched receiver means those receivers having a filter response different than (i.e., unmatched to) the response of the desired signal. The selector 104 statistically evaluates each received signal based upon the known statistics of a "good" signal. The selector 104 selects the signal closest to the "good" signal for decoding in decoder 106. The decoder 106 may be simply a digital to analog (D/A) converter or, in a secure system, the decoder 106 may comprise a suitable decryption device depending upon the particular crypto algorithm used. The decoded (analog) selected signal may be passed from the decoder 106 to any suitable audio processing circuits for reception.

Referring still to FIG. 1, the selector 104 receives the digital signals (which comprise recovered re-clocked data) from the plurality of receivers 102 using, preferably, a microprocessor 108. The microprocessor 108 communicates via an address bus 110 and a data bus 112 with a random-access-memory (RAM) 114, and a read-only-memory (ROM) 116, which may store the operational commands (i.e., the program) of the microprocessor 108. Preferably, the received signals are stored in the RAM 114 and segments thereof removed for statistical evaluation based upon the statistical characteristics of a "good" signal (which may be stored in the ROM 116). Alternately, if the length of the digital signals is appropriately short, the entire message may be evaluated at once. Moreover, those skilled in the art will appreciate that if the clock 118, the RAM 114 and the ROM 116 resided internal to the microprocessor 108, the selector 104 may be embodied as a single device.

In a secure communication system, an information signal is operated upon to produce an encrypted signal that is unintelligible to any unauthorized receiver. Typically, the encrypted signal resembles a random distribution of logical 1's and 0's. Those skilled in the art will appreciate that such a process may be modeled as a series of independant Bernoulli trials. For each Bernoulli trial, the probability P of a one equals the probability of a zero. Therefore, $P(1)=P(0)=\frac{1}{2}$ (or 0.5).

This series of Bernoulli trials together comprise a Binomial distribution. A Binomial distribution will have an expected value E given by:

$$E(K)=N*P \qquad (1)$$

where,
K is the number of times the desired type of bit (or bit pattern) was received;
N is the number of bits (or bit patterns) received; and
P is the probability that any given bit (or bit pattern) is of the desired type.
Given P=0.5, equation (1) becomes:

$$E(K)=N/2 \qquad (2)$$

Thus, in a process having this Binomial distribution, the expected number of logical 1's and 0's is one-half the sample size N. Accordingly, in an uncorrupted or noise-free encrypted signal, there should be an even distribution of received logical 1's and 0's. A signal that deviates from this distribution may either be a corrupted (noisy) encrypted signal or some other signal that is not encrypted.

Those skilled in the art will appreciate, that in any real embodiment, a receiver receiving a noise signal will produce a random distribution of logical 1's and 0's, but they will not be mutually independant. By band-limiting the noise signal (such as by filtering) a receiver modifies the ideal response such that the received signal becomes distinguishable from a noise-free Binomially distributed signal. The statistical interdependancy of the bits is skewed by noise and may be measured by counting the occurance of predetermined bit patterns. In this way, the present invention may determine the quality of a plurality of received signals. Moreover, the distinction may be made using as few as two signals.

If a received message is appropriately short, it may be stored and analyzed at one time on a bit-by-bit basis. In practice, this may take excessive time. Accordingly, the present invention contemplates segmenting the stored signals and evaluating the segments using groups of the received bits. Referring now to FIG. 2, an illustration of the preferred segmentation method is shown. The information signal 200 is parsed into segments 202 each having M bits. In the preferred embodiment of the present invention, M (the length of the segments 202) is selected for convenience to be 8192 bits (i.e., 1024 bytes).

Referring now to FIGS. 3a and 3b, the preferred method of evaluating each segment of each received signal is shown. In FIG. 3a, a segment 202 of a received signal is parsed to form a plurality of sub-segments 300. Each sub-segment is m bits in length, where m is selected to be the length (in bits) of the digital patterns to be evaluated. In the preferred embodiment of the present invention, m is selected as four, thus providing 2048 (8192/4) segments 300 each 4 bits in length. It is known that with 4 bits, it is possible to distinguish 16 different states (i.e., 0000–1111). In FIG. 3b, 16 registers or memory locations (0–15) are reserved to tally each occurrence of each 4 bit pattern received in the segment 202. The segment 202 is investigated to determine which 4 bit pattern is represented by the first sub-segment 300. For example, if the first sub-segment contained "0010", register 3 (or functional equivalent) of FIG. 3b would be incremented by one to record the occurrence of the first sub-segment. In a similar manner, each remaining sub-segment is investigated to determine the occurrence of a bit pattern, and record the occurrence.

Each 4 bit pattern is modeled as a set of 4 Bernoulli trials. Sixteen possible states result, each of which have Binomially distributed occurances. The probability P of any particular one occurring is 0.0625 (i.e., 1/16). Thus, from equation (1):

$$E(K)=N/16 \qquad (3)$$

Since the segment 202 was parsed into 2048 4-bit sub-segments (300), N=2048. Equation (3) then becomes:

$$E(K)=2048/16=128 \qquad (4)$$

Thus, it is expected that the number of occurrences of any 4-bit pattern K will be 128 times in an uncorrupted encrypted signal. By comparing the actual pattern occurrences stored in the registers 0–15, the segment 202 may evaluated to obtain a measure of the signal's quality. In the preferred embodiment of the present invention, each tally of pattern occurrences is subtracted from the expected occurrences. Thus:

$$(\text{Actual \# of pattern K}) - 128 \qquad (5)$$

Equation (5) is repeated for each pattern K, and the result stored in any convenient place, such as the register 0–15 since after the calculation of equation (5), the number of occurrences is no longer required. The difference values (absolute value) are summed to form a composite result of the segment. This result is compared to all other results of each received signal. The lowest result value is the signal closest to a normally distributed signal and, accordingly, is selected for further processing and reception.

However, those skilled in the art will appreciate that even though the segment size is large parsing the received signals potentially may disrupt the distribution. Thus, after analyzing a first segment, signal A may appear superior to signal B, while after analyzing a second segment, signal B may appear superior to signal A. Overall, this random happenstance may have a low probability, however, the present invention prefers to eliminate its possibility of occurrence. Accordingly, as illustrated in FIG. 3c, the present invention stores a "history" of each statistical result of each segment for each received signal in a convenient storage means (such as RAM). Upon each subsequent calculation, the result is averaged with the previous results in the well known moving average operation. By maintaining a moving average of the results of each signal, the present invention eliminates the occurrence of a one segment determination that may cause the selector 104 to select a different signal, and then have to switch back.

Referring still to FIG. 3c, the last several results of each signal are stored to develop a "history table." Initially the first two results are added and divided by two. Next the last three results are summed and divided by three and so on. Preferably, however, the present invention limits the history table, and thus the moving average to a predetermined number of results. In the preferred embodiment of the present invention, the number of previous results retained for the moving average is twelve. Thus, registers 0–11 hold the current result and the previous eleven results in a First-In-First- Out (FIFO) arrangement. Accordingly, after the first twelve results, the moving average is calculated by:

$$\text{Ave.} = \frac{\text{Sum of last 12 results}}{12} \quad (6)$$

As previously mentioned, any real implementation of an unmatched receiver will band-limit a noise signal and therefore alter the characteristic of received noise. It is possible for a receiver designer to "characterize" a receiver by observing the response of a pure noise signal applied at a receiver. In this way the determination of whether a particular receiver tends to produce more logical 1's than logical 0's (or vise versa) may be determined, and thus, the evaluation of whether a received signal is more like a noise signal or a Binomially distributed signal may be improved.

Figure 4:
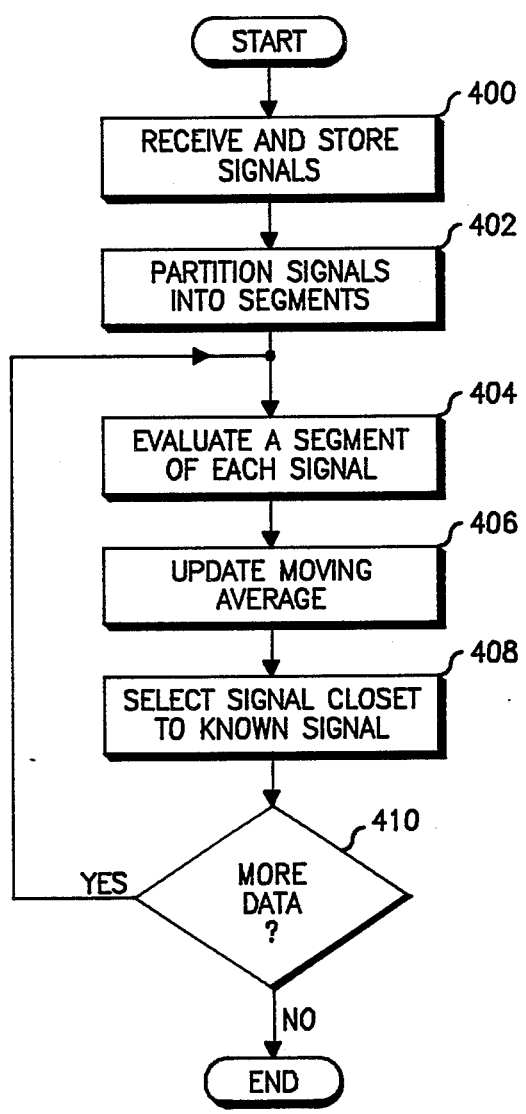
FIG. 4 is a flow diagram of the steps executed by the selector of FIG. 1.

Referring now to FIG. 4, there is shown a flow diagram of the steps executed by the selector 104 of FIG. 1. The routine begins in step 400, where the plurality of signals are received and stored. Step 402 partitions the signals into M bit segments (8192 bits in the preferred embodiment) and transfers control to step 404, which statistically evaluates each of the plurality of segments (as described in conjunction with FIGS. 3a and 3b) to determine which segment of each signal is more like a Binomially distributed signal (and therefore a desirable encrypted signal). Each of the results in step 404 are stored in a convenient storage means (such as RAM) that forms a moving average for each of the recieved signals (Se FIG. 3c). Step 408 selects the signal whose moving average is closest to that of the Binomial distribution. Additionally, step 408 may include such operations as deleting one channel from the plurality channels whose moving average is so consistently poor (over predetermined time intervals) to indicate a total failure of the ability to receive a good signal. Additionally, the moving average from each of the plurality of receivers may be used for such operations as "transmitter steering" in which the central location selects a transmitter closest to the remote source to provide optimum communications. Following step 408 decision 410 determines whether or not there is more data (i.e., more segments) to analyze. If the determination of decision 410 is that there is more data program control is routed back to step 404, which forms a loop with steps 406, 408 and decision 410 until all the segments of all the received signals have been evaluated. However, if the determination of decision 410 is that there is no more data to be analyzed the routine ends and the system awaits the next message transmission.

The present invention bases its decision upon the statistical comparison of a received signal to a known distribution. Although the above discussion has centered around the reception of a plurality of encrypted signals, whose probability density can be shown to be that of the Binomial distribution, any other identifiable distribution may be selected. Thus, it is known by those skilled in the art that a voice signal digitized in a Continuously Variable Slope Delta-Modulator (CVSD) has a characteristic waveform wherein a plurality of logical ones and a plurality of logical 0's tend to be grouped together. Therefore, the segments may be examined for a consecutive string of 1's and 0's. Those received signals that exhibit consecutive strings of ones and zeroes will tend to be closer to a high quality received signal than those that tend towards a more random distribution.

Moreover, a received signal that employs a known repeating pattern, such as a synchronization pattern, may form a unique distribution such that superior quality signals may be distinguished from noisy signals.

While a particular embodiment of the invention has been described and shown, it should be understood that the invention is not limited thereto since many modifications may be made. In particular, any length may be used for the sub-segment 300 (including a length of one; i.e., bit-by-bit) so long as N remains sufficiently large. It is therefore contemplated to cover by the present application any and all such modifications that may fall within the true spirit and scope of the basic underlying principles disclosed and claimed herein.

What is claimed is:

1. A method for selecting an optimum digital signal from a plurality of received digital signals, comprising the steps of:
   (a) storing the plurality of received signals to provide a plurality of stored signals;
   (b) parsing, respectively, each of said plurality of stored signals to provide a plurality of segments;
   (c) determining the number of occurrences of each of a plurality of predetermined bit patterns within said segments to provide a respective tally thereof;
   (d) computing the difference between each of said tallied occurrences to a predetermined expected value of occurrences to provide a plurality of difference values;
   (e) summing said plurality of difference values to provide a respective quality signal for each of the received digital signals;
   (f) selecting the optimum one of the plurality of received digital signals in response to said respective quality signals.

2. The method of claim 1, wherein the step of determining comprises the steps of:
   (c1) parsing each of said segments into a plurality of sub-segments having a predetermined length;
   (c2) tallying the number of occurrences of each of a plurality of predetermined bit patterns defined by said predetermined length of said sub-segments.

3. The method of claim 1, which includes the step of:
   (e1) averaging said respective quality signals with corresponding preceding respective quality signals to provide said respective quality signals for step (f).

4. A method for selecting an optimum digital signal from a plurality of received digital signals, comprising the steps of:
   (a) storing the received digital signals to provide a plurality of stored signals;
   (b) parsing each of said stored signals into segments having a predetermined length;
   (c) determining the number of ocurrences of each of a plurality of predetermined bit patterns within said segments to provide a respective tally thereof;
   (d) computing the difference between each of said tallied occurrences to a predetermined expected value of occurrences to provide a plurality of difference values;
   (e) summing said plurality of difference values to provide a respective quality signal for each of the received digital signals;
   (f) selecting the optimum one of the plurality of received digital signals in response to said plurallity of quality signals;

(g) repeating steps (c) through (f) until all of said segments of each of said plurality of stored signals are evaluated.

5. The method of claim 4, wherein the step of determining comprises the steps of:
   (c1) parsing each of said segments into a plurality of sub-segments having a predetermined length;
   (c2) tallying the number of occurrences of each of a plurality of predetermined bit patterns defined by said predetermined length of said sub-segments.

6. The method of claim 4, which includes the step of: (e1) averaging said respective quality signals with corresponding preceding rrespective quality signals to provide said respective quality signals for step (f).

7. A method for selecting an optimum digital signal from a plurality of received digital signals, comprising the steps of:
   (a) storing the received digital signals to provide a plurality of stored signals;
   (b) parsing each of said stored signals into segments having a predetermined length;
   (c) parsing each of said segments into a plurality of sub-segments having a predetermined length;
   (d) tallying the number of occurrences of each of a plurality of predetermined bit patterns defined by said predetermined length of said sub-segments;
   (e) computing the difference of each of said tallied occurrences to a predetermined expected value of occurrences to provide a plurality of difference values;
   (f) summing said plurality of difference values to provide a respective quality signal;
   (g) averaging, respectively, each of said quality signals with previous quality signals to provide a plurality of averaged quality signals;
   (h) comparing said plurality of averaged quality signals to provide the selected optimum signal;
   (i) repeating steps (d) through (h) until all of said segments of each of said plurality of stored signals are evaluated.

8. A method for selecting an optimum digital signal from a first and second received digital signal, comprising the steps of:
   (a) storing the first and second digital signals to provide a first and second stored signal;
   (b) parsing said first and second stored signals into segments having a predetermined length;
   (c) determining the number of occurrences of each of a plurality of predetermined bit patterns within said segments to provide a respective tally thereof;
   (d) computing the difference between each of said tallied occurrences to a predetermined expected value of occurrences to provide a plurality of difference values;
   (e) summing said plurality of difference values to provide a first and second quality signal;
   (f) comparing said first and second quality signals to provide the selected optimum signal;
   (g) repeating steps (c) through (f) until all of said segments of said first and second stored signals are evaluated.

9. The method of claim 8, wherein the step of determining comprises the steps of:
   (c1) parsing each of said segments into a plurality of sub-segments having a predetermined length;
   (c2) tallying the number of occurrences of each of a plurality of predetermined bit patterns defined by said predetermined length of said sub-segments.

10. The method of claim 8, which includes the step of: (e1) averaging said first and second quality signals with corresponding preceding first and second quality signals to provide said first and second quality signals for step (f).

11. An apparatus for selecting an optimum digital signal from a plurality of received digital signals, comprising:
   means for storing the plurality of received signals to provide a plurality of stored signals;
   means for parsing each of said plurality of stored signals to provide a plurality of segments;
   means for determining the number of occurrences of a plurality of predetermined bit patterns within each of said segments to provide a respective tally thereof;
   means for computing the difference between each of said tallied occurrences to a predetermined expected value of occurrences to provide a plurality of difference values;
   means for summing said plurality of difference values to provide a respective quality signal; and
   means for selecting the optimum one of the plurality of received digital signal in response to said respective quality signals.

12. The apparatus of claim 11, wherein said determining means comprises:
   means for parsing each of said segments into a plurality of sub-segments having a predetermined length;
   means for tallying the number of occurrences of each of a plurality of predetermined bit patterns defined by said predetermined length of said sub-segments.

13. The apparatus of claim 11, wherein said summing means includes means for averaging said quality signals, respectively, with preceding quality signals to provide respective quality signals.

14. An apparatus for selecting an optimum digital signal from a plurality of received digital signals, comprising:
   means for storing the received digital signals to provide a plurality of stored signals;
   means for parsing each of said stored signals into segments having a predetermined length;
   means for parsing a segment into a plurality of sub-segments having a predetermined length;
   means for tallying the number of occurrences of each of a plurality of predetermined bit patterns defined by said predetermined length of said sub-segments;
   means for computing the difference of each of said tallied occurrences to a predetermined expected value of occurrences to provide a plurality of difference values;
   means for summing said plurality of difference values to provide said quality signal;
   means for averaging, respectively, each of said quality signals with all previous quality signals to provide a plurality of averaged quality signals; and
   means for selecting the optimum received signals from the of received signals in response to said plurality of averaged quality signals.

15. An apparatus for selecting an optimum digital signal from a first and second received digital signal, comprising:
   means for storing the first and second digital signals to provide a first and second stored signal;
   means for parsing said first and second stored signals into segments having a predetermined length;

means for determining the number of occurrences of a plurality of predetermined bit patterns within each of said segments to provide a respective tally thereof;

means for computing the difference between each of said tallied occurrences to a predetermined expected value of occurrences to provide a plurality of difference values;

means for summing said plurality of difference values to provide a respective quality signal;

means for averaging, respectively, said first and second quality signals with all previous first and second quality signals to provide a first and second average quality signal; and means for selecting either said first and second received signals in response to said first and second averaged quality signals to provide the selected optimum signal.

16. The apparatus of claim 15, wherein said evaluating means comprises:

means for parsing each of said segments into a plurality of sub-segments having a predetermined length;

means for tallying the number of occurrences of each of a plurality of predetermined bit patterns defined by said predetermined length of said sub-segments.

* * * * *

UNITED STATES PATENT AND TRADEMARK OFFICE
CERTIFICATE OF CORRECTION

PATENT NO. : 4,710,945

DATED : December 1, 1987

INVENTOR(S) : Bocci et al.

It is certified that error appears in the above-identified patent and that said Letters Patent is hereby corrected as shown below:

Claim 6, column 7, line 13, "rrespective" should read --respective--.

Claim 14, column 8, line 59, "signals" should be --signal--.
line 60, after the word "the" insert thereat the word --plurality--.

Signed and Sealed this

Twenty-fourth Day of May, 1988

Attest:

Attesting Officer

DONALD J. QUIGG

Commissioner of Patents and Trademarks